UNITED STATES PATENT OFFICE 2,091,373

ACETALS OF β-KETOALDEHYDES

Johannes Nelles, Leverkusen-Schlebusch, Germany, assignor to I. G. Farbenindustrie Aktiengesellschaft, Frankfort-on-the-Main, Germany No Drawing. Application November 6, 1936, Serial No. 109,609. In Germany November 12, 1935

3 Claims. (Cl. 260—134)

The present invention relates to β-keto-acetals.

In accordance with my present invention new ketones are obtained which probably correspond to the following formula $$\text{acyl—CH}_2\text{—C}\overset{\text{OR''}}{\underset{\text{OR''}}{\text{R'}}}$$

wherein R' stands for a member of the group consisting of hydrogen alkyl and aryl and R'' stands for alkyl.

Suitable starting materials for the preparation of my new products are β-halogen-vinyl ketones which can be prepared, for example, by causing carboxylic acid halides of the aliphatic or aromatic series, such as acetyl chloride, stearic acid chloride or benzoyl chloride to react upon acetylene or a homologue thereof, such as methyl acetylene, phenyl acetylene or heptine in the presence of a Friedel Crafft's catalyst. These compounds, if reacted upon with aliphatic alcohols in the presence of alkaline reacting substances, are easily converted into ketones of the character defined above. Examples of suitable alkaline-reacting substances are alkali metal hydroxides or carbonates and tertiary amines. As alcohols there can be employed primary as well as secondary and tertiary carbinols, cycloaliphatic alcohols being intended to fall within the scope of the term "aliphatic alcohols". The course of the reaction is the more surprising as β-halogenvinylketones are very sensitive towards alkaline reacting substances in aqueous or indifferent medium and easily form ununiform resin-like products.

My new compounds may be defined as acetals of β-keto-aldehydes. They represent valuable intermediate products for organic synthesis as they are similar in structure to and behave like acetyl acetic esters. A preferred form of my invention is to be seen in those products wherein the ethyl group is the residue of a low aliphatic acid, such as acetic acid, propionic acid or butyric acid though higher acids, such as stearic acid or aromatic acids, such as benzoic acid are not excluded from the scope of my claims.

The following examples illustrate the invention the parts being by weight:

Example 1

26 parts of β-chloro-vinylmethylketone are mixed with 20 parts of methyl alcohol and stirred with a solution of 10 parts of sodium hydroxide in 80 parts of methyl alcohol for some hours, the temperature being advantageously kept below +15° C. After separating the precipitated sodium chloride the liquid is distilled off. About 23 parts of dimethylacetal of acetylacetaldehyde are thus obtained as a colorless oil of boiling point 67–69° C. under 20 mm. pressure.

Example 2

10 parts of phenylchlorovinylketone are mixed with 20 parts of ethyl alcohol and then stirred for some hours while cooling with a suspension of 50 parts of anhydrous sodium carbonate in 200 parts of ethyl alcohol. After separating the sodium chloride, the di-ethylacetal of benzoyl-acetaldehyde is obtained by fractional distillation.

Example 3

26 parts of methylchlorovinylketone are mixed with 30 parts of butanol and added drop by drop into a suspension of 12 parts of sodium hydroxide in 100 parts of butanol while cooling and stirring the mixture. After having added the whole quantity of methylchlorovinylketone and butanol the temperature is still kept some time at 15°, the precipitated sodium chloride is separated and the solution distilled in the vacuo. The dibutylacetal of the acetylacetaldehyde of the boiling point 112° at 18 mm. pressure is thereby obtained as nearly colorless liquid.

Example 4

150 parts of isobutylchlorovinylketone are added drop by drop to a solution of 60 parts of potassium hydroxide in 500 parts of ethanol while cooling the mixture. Hereafter the solution is heated for 2 hours at 30–40°. The precipitated potassium chloride is removed by filtration and the filtrate evaporated. After having distilled off the excess ethyl alcohol the residue is fractionated in vacuo whereby the diaethylacetal of the β-ketoisoheptylaldehyde of the boiling point 150–120° at 18 mm. pressure is obtained in a good yield.

I claim:—

1. The products of the following probable formula $$\text{acyl—CH}_2\text{—C}\overset{\text{OR''}}{\underset{\text{OR''}}{\text{R'}}}$$

wherein R' stands for a member of the group consisting of hydrogen alkyl and aryl and R'' stands for alkyl, these products being substantially identical with those obtainable by causing aliphatic alcohols to react upon β-halogen-vinylketones in the presence of alkaline reacting substances.

2. The products of the following probable formula

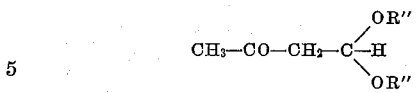

wherein R" stands for alkyl, these products being substantially identical with those obtainable by causing aliphatic alcohols to react upon methyl-β-chlorovinylketone in the presence of alkaline reacting substances.

3. The product of the probable constitution of the dimethylacetal of acetyl-acetaldehyde, this product being substantially identical with that obtainable by causing methyl-alcohol to react upon methyl-β-chloro-vinylketone in the presence of alkaline reacting substances.

JOHANNES NELLES.